United States Patent [19]

Langer

[11] Patent Number: 4,845,883
[45] Date of Patent: Jul. 11, 1989

[54] GLIDING FISHING LURE

[76] Inventor: Alexander G. Langer, 94 Saint Rose St., Jamaica Plain, Mass. 02130

[21] Appl. No.: 211,215

[22] Filed: Jun. 23, 1988

[51] Int. Cl.[4] .............................................. A01K 97/08
[52] U.S. Cl. ........................................ 43/42; 43/42.39
[58] Field of Search ................ 43/42, 42.18, 42.22, 43/42.24, 42.29, 42.37, 42.39, 42.47, 42.9, 43.14, 43.16, 44.2

[56] References Cited

U.S. PATENT DOCUMENTS

| | | | |
|---|---|---|---|
| 1,321,850 | 11/1919 | Rhodes . | |
| 1,394,313 | 10/1921 | Leeper . | |
| 2,046,370 | 7/1936 | Drake et al. | 43/38 |
| 2,239,802 | 4/1941 | Westby | 43/46 |
| 2,437,523 | 3/1948 | Hahn | 43/46 |
| 2,685,145 | 8/1954 | Dean | 43/42.39 |
| 2,715,790 | 8/1955 | Carpenter | 43/42.39 |
| 2,755,593 | 7/1956 | Thurman | 43/44.2 |
| 2,795,076 | 6/1957 | Luft | 43/42.39 |
| 3,243,912 | 4/1966 | Newman | 43/42.16 |
| 3,401,483 | 9/1968 | Bellah et al. | 43/42.39 |
| 3,724,117 | 4/1973 | Flanagan | 43/42.24 |
| 3,738,046 | 6/1973 | Johnson | 43/42.39 |
| 3,744,175 | 7/1973 | Bellah et al. | 43/42.39 |
| 3,922,811 | 12/1975 | Ellingson | 43/42.39 |
| 4,334,381 | 6/1982 | Carver et al. | 43/42.39 |

Primary Examiner—Nicholas P. Godici
Assistant Examiner—Michael William Starkweather
Attorney, Agent, or Firm—Weingarten, Schurgin, Gagnebin & Hayes

[57] ABSTRACT

A fishing lure made of a soft, non-rigid material shaped and weighted to glide in water is provided. Weights precisely balance the lure to produce the glide and to stabilize deflection of the lure caused by any tendency of the soft, non-rigid material to deflect. A hook for catching fish is attached to the lure and provides the means for connecting the lure to a fishing line controlled by a fisherman.

21 Claims, 9 Drawing Sheets

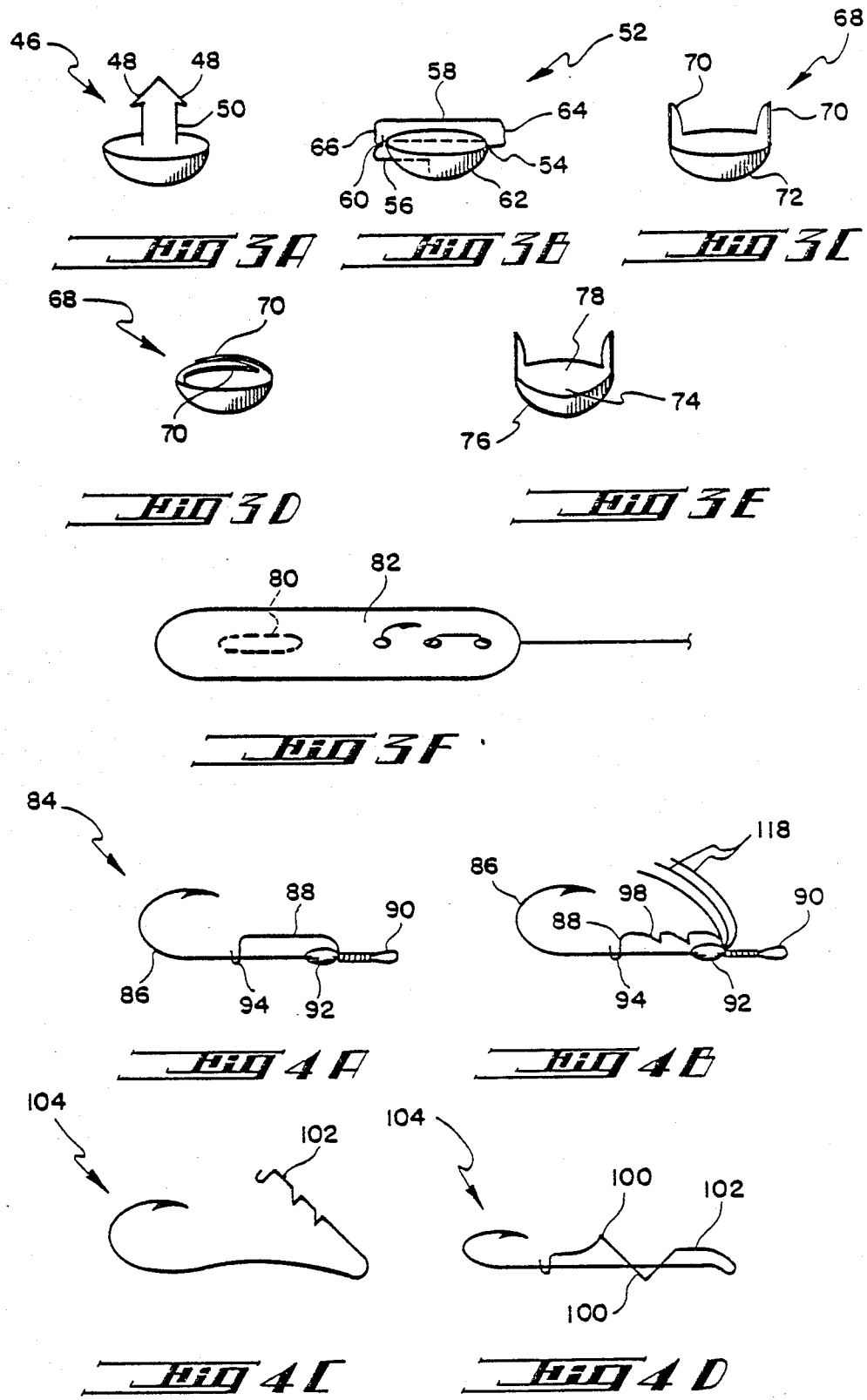

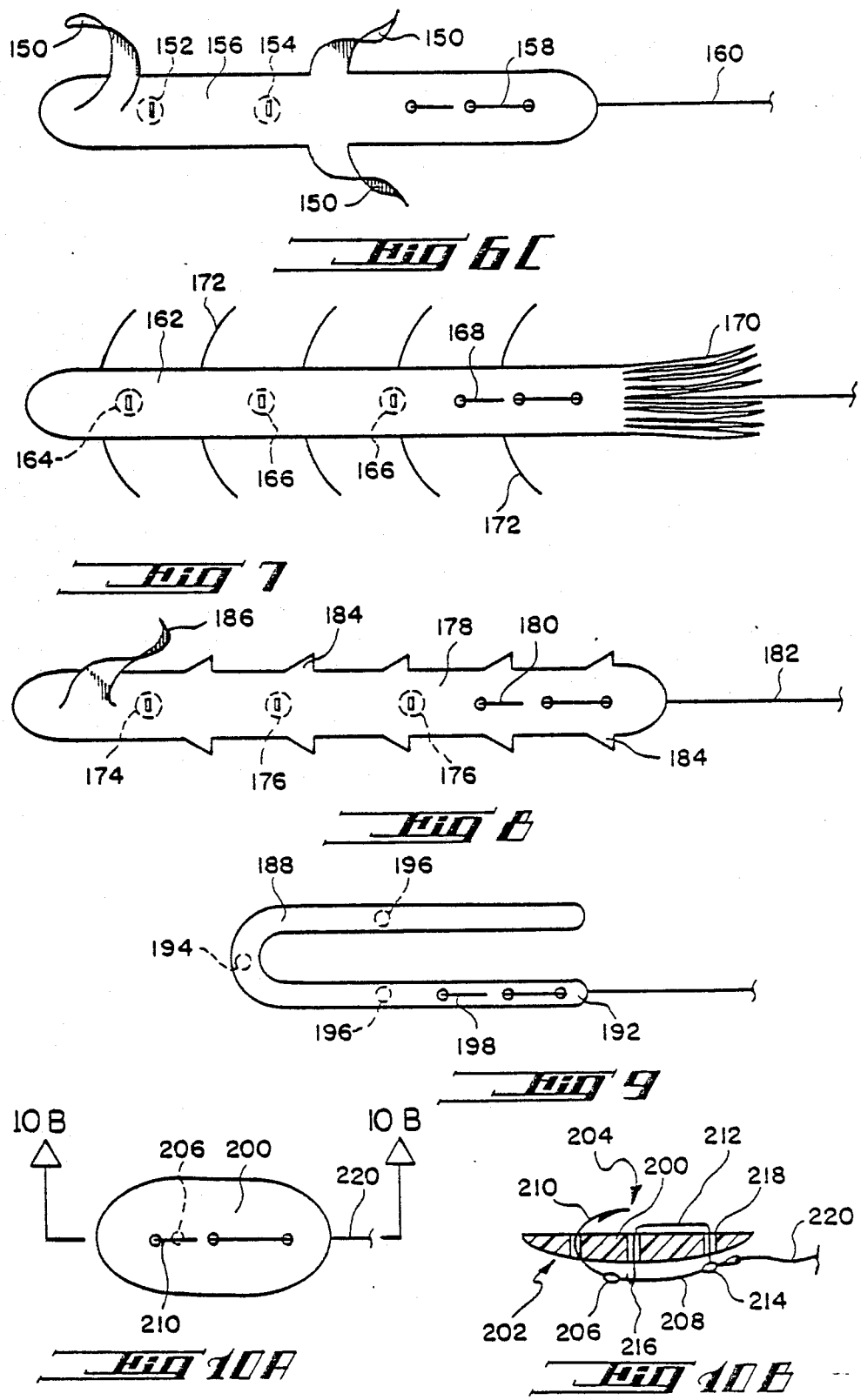

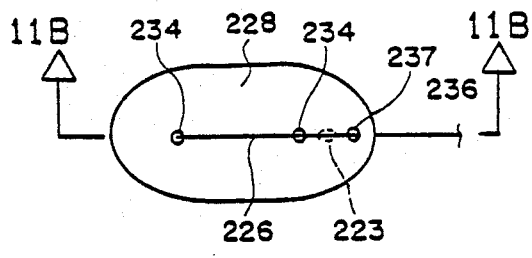
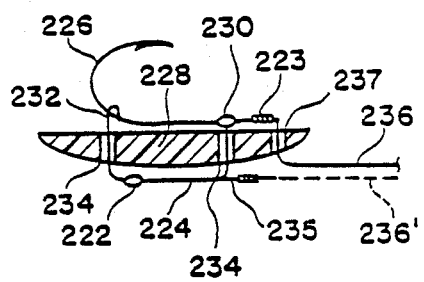
_Fig 11A_   _Fig 11B_
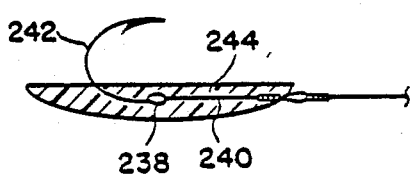
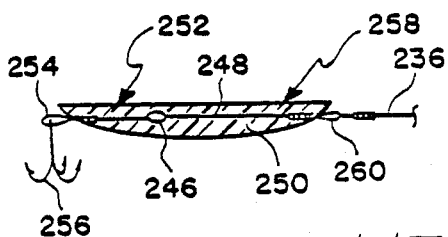
_Fig 12_   _Fig 13_
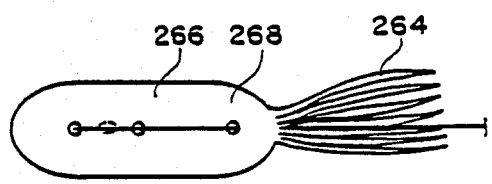
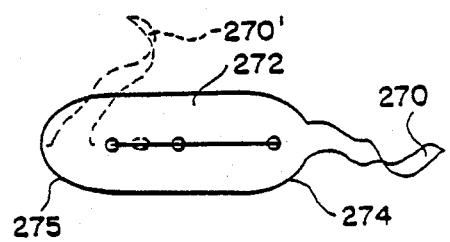
_Fig 14_   _Fig 15_
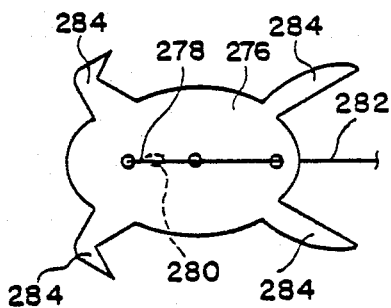
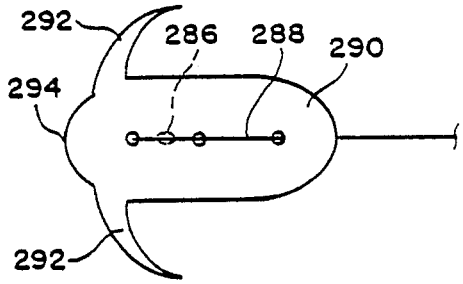
_Fig 16_   _Fig 17A_
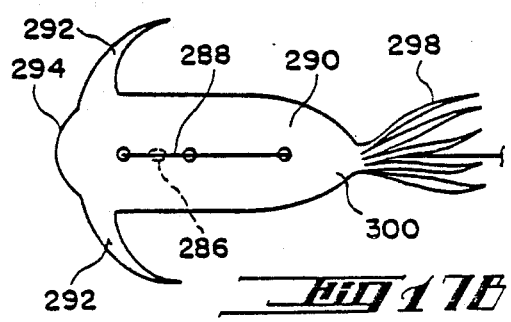
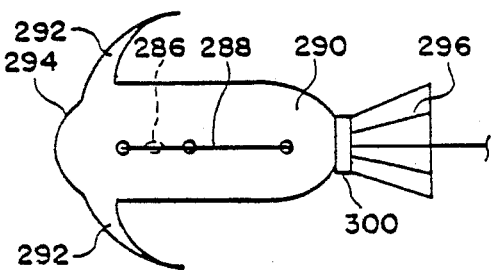
_Fig 17B_   _Fig 17C_

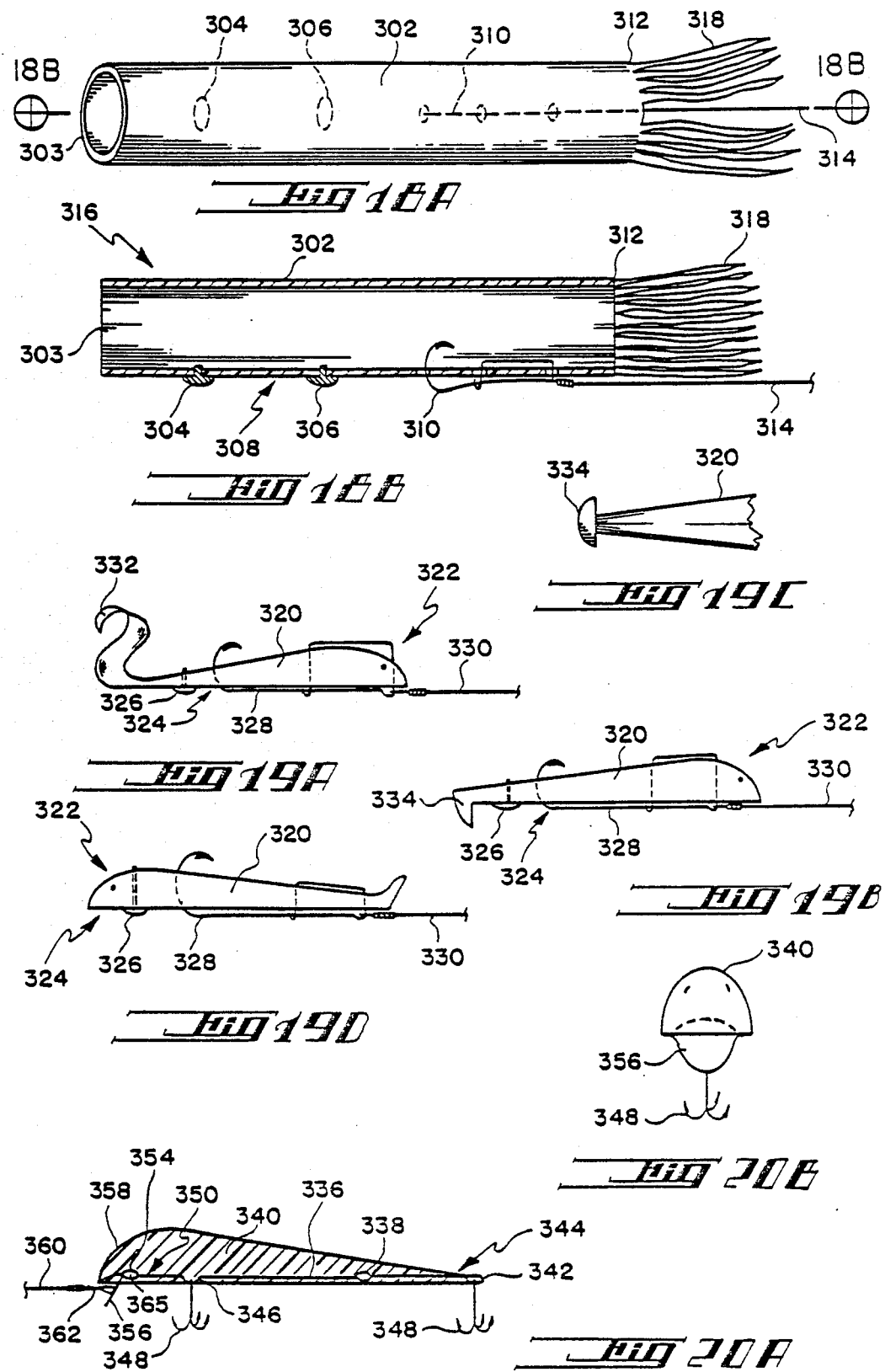

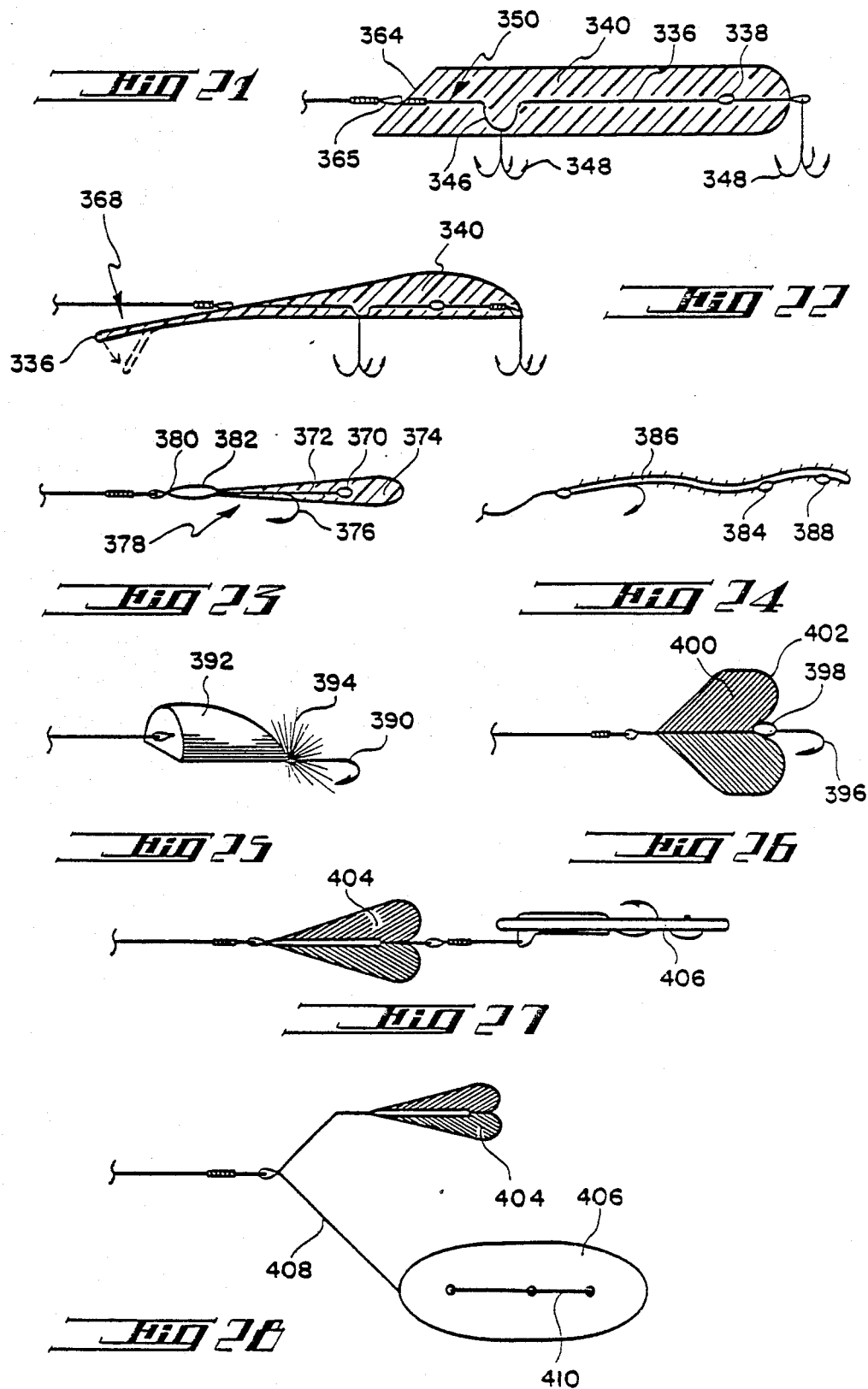

GLIDING FISHING LURE

FIELD OF THE INVENTION

This invention relates to fishing lures, and in particular to gliding fishing lures made of soft, non-rigid materials.

BACKGROUND OF THE INVENTION

Fishing lures which glide in water away from a fisherman are known. However, all such gliding lures have been made of rigid, hard materials such as metal or hard plastic. No gliding lures made of soft, non-rigid materials are known.

Hard lures are designed to be continuously retrieved under a tight line so that a fish strike can be immediately felt. Hard lures are also designed to be used as top water lures so that strikes can be seen immediately. Hard lures, however, are much less effective in situations where a lure must be moved very slowly, or where a lure is used under a semi-slack line where strikes cannot be instantly detected.

The problem with the gliding lures disclosed to date is that they are hard lures. During a glide, when the fishing line must be slack, it is difficult to detect a strike on a gliding lure because the fishing line is not taut and not able to transmit the sensation of the strike back to the fisherman. Since most fish strike gliding lures on a glide, a fish must hold onto the gliding lure until the fisherman can tighten his line, feel the strike and set the hook. Because a gliding lure moves slowly on its glide, it is subject to close scrutiny by a fish. A fish would quickly spit out a hard gliding lure, yet would hold onto a soft lure until a fisherman tightened his line, felt the fish and set the hook.

The properties of soft materials, such as softness and flexibility in water, which produce advantages found in soft lures, make design and construction of soft gliding lures difficult. The chief characteristic of soft materials that must be overcome to produce soft gliding lures is deflection of the materials in water. Materials that are soft and deflect in water are less desirable than hard, rigid materials as materials for gliding lures. Therefore, unlike hard lures which are rigid and can be easily be shaped and weighted to produce a glide, soft lures, which greatly deflect and easily lose their shape, are difficult to balance with weights to produce a glide. Therefore, a complex set of problems must be overcome to produce gliding lures having fish catching advantages found in soft lures and yet possessing the capability to glide.

SUMMARY OF THE INVENTION

A soft, non-rigid fishing lure shaped and weighted to control flex for gliding upon immersion in water is provided. The lure is made of a soft, pliable material shaped and weighted to produce a glide and in some embodiments shaped to resemble a living organism. Weights precisely balance the lure to produce a glide in water and to stabilize the deflection of the lure caused by the tendency of the soft material to deflect. A hook for catching fish is attached to the lure and also provides the means for connecting the lure to a fishing line controlled by a fisherman.

The advantage of the invention is that it is soft, flexible and possesses gliding ability. The softness and flexibility of the lure gives it a lifelike feel and action under water so that it more realistically simulates a live natural creature. Also, although a fish will quickly spit out a hard lure, it will swim around with and sometimes swallow a soft lure, thus giving a fisherman more time to react and set a hook.

The gliding ability of the soft, non-rigid lure of the invention permits the lure to slowly sink in a controllable direction away from a fisherman. Therefore, during a glide the lure simulates a moving living organism more realistically than a sinking lure. Furthermore, because the lure moves away from a fisherman, it can be used to reach places impossible to reach with a sinking lure. For example, because of its gliding capability, the lure can reach fish hiding under overhanging tress, under-cut banks, docks, moored boats and submerged objects.

Because the lure has positive movement on its descent, it can also act as two lures in one. It can be used to simulate a leisurely swimming, living organism during a glide, and can be used during retrieval like a conventional sinking lure to simulate a fast-swimming or wobbling organism moving through the water or on the water's surface.

The lure also glides during descent in water on a shallow path and steeply ascends to the water surface during retrieval. Therefore, the lure can be advanced without re-casting. The lure quickly rises to the surface upon a strong pull on the fishing line and then advances away from the fisherman upon a glide to a spot at a greater distance from the fisherman. This action is useful for advancing the lure into areas inaccessible by conventional casting.

The soft, non-rigid gliding lure can be configured in many shapes to resemble many different life forms or to produce special gliding or retrieval effects. For example, the lure can be configured to resemble a flat worm, a conventional spoon lure, a hollow tube, a minnow or other fish, a conventional crankbait or plug lure, or a conventional subsurface fly lure. Tails, filaments, legs, curly appendages, lips, sparkles, buzzers, spinners and other features can be added to produce lures resembling stylized lizards, frogs, crayfish, centipedes, and other water organisms or to cause disturbances, noise or flash in water which tend to attract fish. Furthermore, the lure can be formed in a U-shape to simulate a curled snake or eel.

DESCRIPTION OF THE DRAWINGS

FIG. 3A is a perspective view of an embodiment of leading and trailing weights used in construction of fishing lures in accordance with the invention.

FIGS. 3B and 3C are perspective views of alternative embodiments of leading and trailing weights used in construction of fishing lures in accordance with the invention.

FIG. 3D is a perspective view of the leading and trailing weight shown in FIG. 3C with tabs folded over.

FIG. 3E is a perspective view of the leading and trailing weight shown in FIG. 3C and having an eccentrically-shaped body.

FIG. 3F is a perspective view of a leading weight embedded into the body of a lure constructed in accordance with the invention.

FIG. 4A is a plan view of one embodiment of a hook used in construction of fishing lures in accordance with the invention.

FIGS. 4B, 4C, 4E, 4F and 4G are plan views of alternative embodiments of hooks used in construction of fishing lures in accordance with the invention.

FIG. 4D is a top perspective view of the hook of FIG. 4C.

FIG. 6C is a fishing lure constructed in accordance with the invention to resemble a flat worm with three curly appendages.

FIG. 7 is a fishing lure constructed in accordance with the invention to resemble a centipede.

FIG. 8 is a fishing lure constructed in accordance with the invention to resemble a flat worm with a curly appendage and multiple rib simulations.

FIG. 9 is a plan view of a fishing lure constructed in accordance with the invention to resemble a snake or eel.

FIG. 10A is a plant view of a spoon lure constructed in accordance with the invention.

FIG. 10B is a cross-section view, taken along line 10—10, of the fishing lure shown in FIG. 10A.

FIG. 11A is a plan view of an alternative embodiment of a spoon lure constructed in accordance with the invention.

FIG. 11B is a cross-section view, taken along line 11—11, of the fishing lure shown in FIG. 11A.

FIGS. 12 and 13 are side cross-section views of alternative embodiments of spoon lures constructed in accordance with the invention.

FIG. 14 is a plan view of a spoon lure with a streaming tail constructed in accordance with the invention.

FIG. 15 is plan view of spoon lure with a curly appendage constructed in accordance with the invention.

FIG. 16 is a plan view of a spoon lure constructed in accordance with the invention to resemble a frog.

FIGS. 17A, 17B, and 17C are plan views of spoon lures constructed in accordance with the invention to resemble crayfish.

FIG. 18A is a fishing lure constructed in a tubular shape with a streaming tail in accordance with the invention.

FIG. 18B is a cross section view, taken along the line 18—18, of the fishing lure shown in FIG. 18A.

FIGS. 19A, 19B, and 19D are side view of several embodiments of fishing lures constructed in accordance with the invention to resemble small fish.

FIG. 19C is a detailed top view of the bulbous tail portion of the lure shown in FIG. 19B.

FIG. 20A and 21 are side cross-section views of alternative embodiments of crankbait or plug fishing lures constructed in accordance with the invention.

FIG. 20B is a front view of the fishing lure shown in FIG. 20A.

FIG. 22 is a side cross-section view of an alternative embodiment of a crank bait or plug fishing lure constructed in accordance with the invention and having a soft, flexible lip.

FIGS. 23 and 24 are side cross-section views of subsurface fly lures constructed in accordance with the invention.

FIG. 25 is a perspective view of a popper subsurface fly lure constructed in accordance with the invention.

FIG. 26 is a perspective view of an alternative embodiment of a subsurface fly lure constructed in accordance with the invention.

FIG. 27 is a side plan view of one embodiment of the invention used in conjunction with a buzzer.

FIG. 28 is a plan view of one embodiment of the invention constructed as a buzzbait.

DETAILED DESCRIPTION OF THE INVENTION

The present invention contemplates a lure of a soft, flexible body and weights thereon that cooperate to produce an in-water glide. The body has a shape that imparts lift upon a glide in water. The weights control body flex to produce a desired glide path.

Based on in-water testing of lures made of materials having the deflections in air shown in the following table, a means of shaping and weighting soft, non-rigid fishing lures to produce a glide in water was discovered.

| VERTICAL DEFLECTIONS OF MATERIALS IN INCHES UNDER DEAD LOAD PER VARIOUS LENGTHS OF MATERIAL | | | | |
|---|---|---|---|---|
| | LENGTH OF MATERIAL HELD HORIZONTALLY AT ONE END[1] (INCHES) | | | |
| LURE CONSTRUCTION | 1 | 2 | 3 | 4 |
| 1. RIGID (Metal or hard plastic) | 0.0 | 0.0 | 0.0 | 0.0 |
| 2. NON-RIGID, SOFT (80% plastisol, 20% vinyl thickener) | 0.15 | 1.2 | 2.45 | 3.55 |
| 3. NON-RIGID, EXTRA SOFT (90% plastisol 10% vinyl thickener | 0.15 | 1.4 | 2.63 | 3.87 |
| 4. NON-RIGID, SUPER SOFT (100% vinyl plastisol) | 0.35 | 1.63 | 2.87 | 3.93 |

Note:
[1]Vinyl materials used in the tests were 1 inch wide by ⅛ inch thick.

Figure 1A:
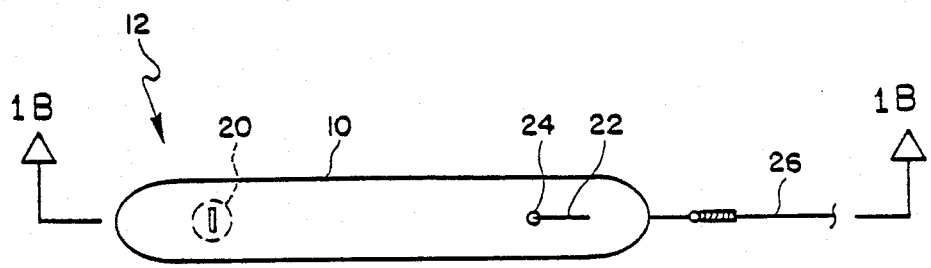
FIG. 1A is a plan view of a fishing lure constructed in accordance with the invention to resemble a short, flat worm.
Figure 1B:
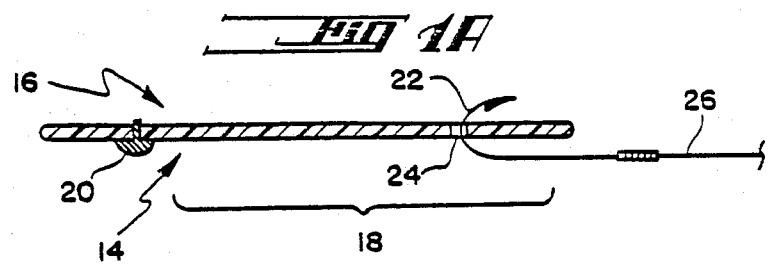
FIG. 1B is a cross-section view, taken along line 1—1, of the fishing lure shown in FIG. 1A.

Experimentation revealed that the key to making a non-rigid gliding lure is to create a lure that is weighted based upon the deflection properties of the lure material. As can be seen in FIGS. 1A and 1B, body 10 of soft, non-rigid lure 12 is generally flat or slightly concave or convex on bottom 14 and flat or slightly concave or convex on top 16. The substantially flat shape of bottom 14 gives lure 12 a horizontal lift surface 18 with which lure 12 can glide through water when properly weighted with leading weight 20 to control the lure material's deflection properties under the action of the glide and the resistance of water. Hook 22 is held by hole 24 and connects with line 26 to provide the means for controlling the lure and for retrieving fish that strike the lure and become caught by the hook.

Figure 2A:
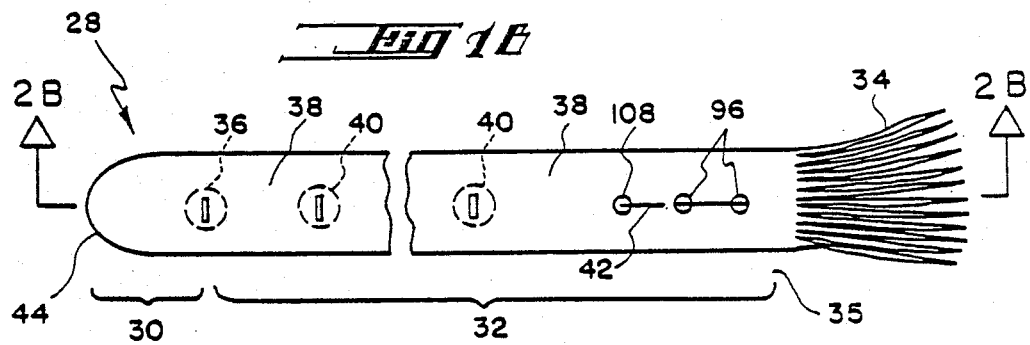
FIG. 2A is a plan view of a fishing lure constructed in accordance with the invention to resemble a long, flat worm with a streaming tail.
Figure 2B:
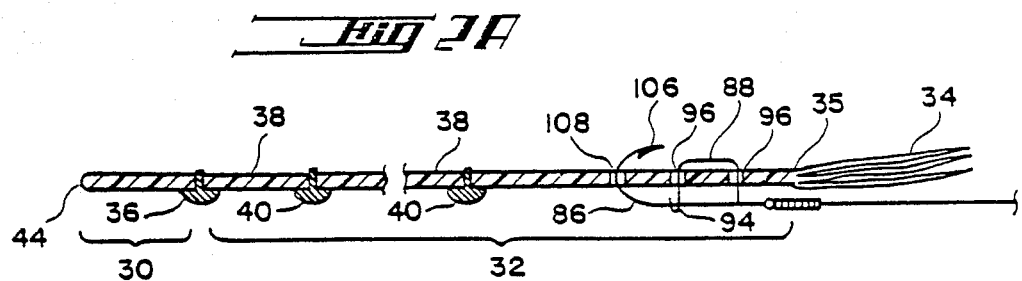
FIG. 2B is a cross-section view, taken along line 2—2 of of the fishing lure shown in FIG. 2A.

Several considerations must be considered during the design and construction of the soft gliding lure. As can be seen in FIGS. 2A and 2B, non-rigid gliding lure 28 has a leading edge 30 which sets the angle of glide of the lure. Lift surface 32 gives the lure most of its lift during a glide. Tail 34, an optional part of the lure, stabilizes and slows the lure during a glide. During retrieval, tail 34 also gives the lure a side to side swimming motion and keeps the lure from rolling over. Tail 34 also creates a drag during retrieval that causes the lure's trailing edge 35 to rise, thus causing the lure to sharply rise at an angle towards the water surface.

Leading weight 36 produces forward gliding motion. The weight of body 38 in the area of lift surface 32, including trailing weights 40, and hook 42 stabilize the flexing properties of the lure's soft, non-rigid material and assist leading weight 36 in providing forward gliding motion. Leading weight 36 is typically heavier than trailing weights 40 and hook 42 because leading weight 36 must deflect lure 28 slightly downward and must provide initial forward movement to begin a glide. Once leading weight 36 begins to glide, the remainder of lure 28, including trailing weights 40 and hook 42, follows. Leading edge 30 must have sufficient surface area to give enough lift to produce as shallow a glide as possible, yet must not be too large of an area such that so much lift is produced that the lure stalls during a glide. The size of leading edge 30 and the mass and positions of leading and trailing weights 36 and 40 respectively and hook 42 are dependent upon the deflection properties of the material from which lure 28 is constructed.

Thus, a combination of lift produced by leading edge 30 and lift surface 32 and sink produced by the inherent weight of body 38, the weight of leading weight 36, the weight of trailing weights 40 and the weight of hook 42, when balanced to control material deflection, produces a useful glide. The formulas below guide construction of a non-rigid gliding lure in accordance with the invention. The formulas must not be viewed, however, as limits of the invention.

A useful length of leading edge 30 from tip 44 to leading weight 36 is determined by the following formula:

$$\text{LENGTH OF LEADING EDGE} = \frac{2 - \text{VERTICAL DEFLECTION (IN.)}}{3} \times \text{GLIDE ANGLE FACTOR}$$

where Vertical Deflection is the amount of vertical distance that the material from which the lure is made deflects from the horizontal when a two inch by one inch by ⅛ inch piece of the material is held horizontally, and Glide Angle Factor is a factor determined by the amount of rear drag that the lure must carry as well as the desired glide angle. Glide Angle Factors (GAF) for the following configurations are given:

| | |
|---|---|
| GAF FOR LURES WITH A LONG TAIL/ STABILIZER (Where length of tail = 70% of length of total planing surface) | = 0.265 |
| THE AVERAGE GAF FOR LURES WITH SHORT TAIL (Where length of tail = 33% of length of total planing surface) | = 0.45 |
| GAF FOR LURES WITHOUT SIGNIFICANT DRAG (no tail) | = 0.65 |

As the length of tail 34 increases, the Glide Angle Factor decrease because the drag of tail 34 tends to increase the tendency for soft, non-rigid gliding lure 28 to stall. To make lure 28 dive at a sharper angle, the Glide Angle Factor can be decreased as well. To make lure 28 dive slower, but not necessarily traverse more horizontal distance, the Glide Angle Factor can be increased. If the Glide Angle Factor is increased too much, however, lure 28 will stall and sink, fluttering downward.

The size of leading weight 36 only need be enough to deflect the material from which the lure is constructed downward more than the weight of the following portion of body 38, including trailing weights 40 and hook 42 attached to body 38. This means that the size of leading weight 36 is generally at least twice the size of a single trailing weight 40.

The number of trailing weights 40 varies according to the length of body 38, and the maximum distance between trailing weights 40 is based upon the following formula derived from the deflection of the material from which the lure is constructed.

$$\text{MAXIMUM DISTANCE BETWEEN TRAILING WEIGHTS} = \frac{2 - \text{VERTICAL DEFLECTION (IN.)}}{3}$$

where Vertical Deflection is the amount of vertical distance that the material from which the lure is constructed deflects from the horizontal when a two inch by one inch by ⅛ inch piece of the material is held horizontally.

Trailing weights 40 used in experiments were split-shot having a weight of 1/64 oz. This size is appropriate for lures of ⅛ inch thickness used in calm waters and no winds. Trailing weights 40 can be significantly heavier for lures used in other-than-calm waters or in windy conditions where trailing weights 40 and leading weight 36 must overcome increased drag on the fishing line caused by water currents, or air currents blowing on the portion of the fishing line above the water's surface.

In general as the amount of drag produced by lure 28 decreases, the amount of weight body 38 carry correspondingly increases. Also, short, squat designs such as spoon designs (FIGS. 10A through 17C) carry heavier weights. These characteristics can be seen in the following table.

| LURE TYPE | RATIO OF LURE'S TOTAL PLANING AREA TO TOTAL WEIGHT AVG LIFT AREA (SQ. IN. 1/64 OZ. WEIGHT) |
|---|---|
| SPOON | .66 |
| FLAT WORMS WITHOUT TAIL | 1.10 |
| FLAT WORMS WITH TAIL | 1.50 and higher |

Tail 34 works best when it is one-third the length of lift surface 32. This is because the one-third size provides the best trade-offs among providing drag during a glide to stabilize lure 28, providing drag during retrieval when lure 28 is pulled towards a fisherman and minimizing excess drag which causes lure 28 to stall. The extra drag produced by tail 34 during retrieval makes lure 28 rise quickly and move in a swimming motion. Furthermore, tail 34 serves as a fish attractant because of its undulating motion.

Body 38 and tail 34, can be made of any soft, flexible water-resistant material including such artificial materials as Alcryn, vinyl plastisol and other vinyl, rubber and urethane compounds. Body 38 and tail 34 can also be made of such natural materials as pork rind and soft leather. In some embodiments of the invention, the body can even be made of feathers. In experiments, pure vinyl plastisol and vinyl plastisol thickened with 10% and 20% vinyl thickener were used.

Figure 2C:
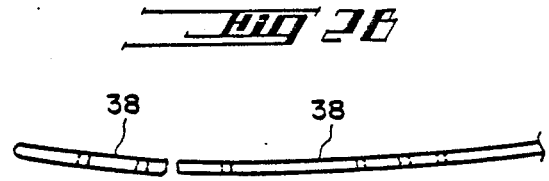
FIG. 2C is a side view of the body of the lure shown in FIGS. 2A and 2B stress molded into a curved shape.

Body 38 can also be stress formed in a desired shape to produce a body of a desired flexibility. For example, as shown in FIG. 2C, body 38 can be molded in a curved shape so that body 38 can support the heavier leading and trailing weights needed for a lure used in moving waters or used in windy conditions. Stiffeners, such as longitudinal ribs or frames made of thin wire, plastic or other materials can also be embedded in body 38 during fabrication of the lure to produce a body of a desired flexibility or to produce a body which can support heavier weights. Also, water or other liquids can be injected into body 38, or body 38 can be made of other combinations of soft and hard materials, to produce a body of a desired flexibility, or one which can support heavier weights. Furthermore, sparkles can be added to body 38 and/or tail 34 to give the lure flash which attracts fish.

Leading weight 36 and trailing weights 40 can be made of lead, but other materials can also be used. FIGS. 3A through 3F show typical designs for both leading or trailing weights. In FIG. 3A, weight 46 is configured to look like a thumbtack and is pressed into the body of a non-rigid gliding lure. Weight 46 is retained by barbs 48 disposed on shaft 50. In FIG. 3B, weight 52 is attached to the body of a non-rigid gliding lure by means of wire retainer 54 having eyelet 56, loop portion 58 and catch 60. Wire retainer 54 is partially embedded into body 62 of weight 52 and clamps body 62 to the body of the lure. Loop portion 58 of wire retainer 54 passes through the body of the lure at points 64 and 66 on wire retainer 54. In FIGS. 3C and 3D, weight 68 is attached to the body of the lure by means of tabs 70 integrally formed with body 72 of weight 68. Tabs 70 pass through the body of the lure and are then folded toward body 72 of weight 68.

FIGS. 3A through 3D show weights having bodies of symmetrical horizontal cross section. The bodies, however, can be eccentrically formed so that the weights can be used to control the lateral direction of a soft, non-rigid gliding lure's glide. FIG. 3E shows the weight 68 of FIGS. 3C and 3D having such an eccentrically formed body. Eccentric portion 74 of body 76 contains more mass then non-eccentric portion 78 and when eccentric portion 74 is laterally positioned from the center line of a soft, non-rigid gliding lure, eccentric portion 74 causes the lure to tilt and move in the direction of the lateral position of the eccentric portion.

As can be seen in FIG. 3F, a weight 80 can also be formed into a rectangular or other shape and embedded into the body 82 of a lure during fabrication of the body.

Hook 42 of FIGS. 2A and 2B is positioned at the rear of lure 28 and for weighting purposes is considered the equivalent of of a trailing weight. Hook 42 can be specially fabricated like the one shown in FIGS. 2A and 2B. Hook 42 can be a conventional, commercially available hook 42 pressed through a hole in the body of the lure as shown in FIGS. 1A and 1B. A number of hook configurations, shown in FIGS. 4A though 4G, provide better retention of the hook than provided by the hook arrangement of FIGS. 1A and 1B.

In FIG. 4A, hook 84 comprises a hook body 86 and a retaining wire 88 attached to hook body 86 near eyelet 90 by means of metal bond 92. Retaining wire 88 has a catch 94 which is used to releasably fasten retaining wire 88 to hook body 86. As can be seen in FIGS. 2A and 2B, which shown a soft, non-rigid gliding lure employing the hook of FIG. 4A, retaining wire 88 passes through holes 96 in body 38 of lure and when catch 94 is fastened to hook body 86, retaining wire 88 firmly clamps the hook to the lure.

As shown in FIG 4B, retaining wire 88 can contain bends formed into points to improve the clamping action of the hook 42 over the configuration shown in FIG. 4A.

Figure 4E:
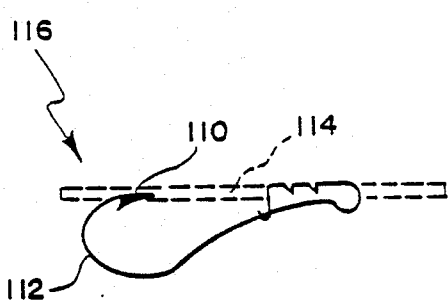

As shown in FIGS. 4C and 4D, the hook can also be fabricated from a single wire, thus eliminating the need for metal bonding. Lateral bends 100, as shown in FIG. 4D, can also be added to retaining wire portion 102 of hook 104 to reduce the tendency of the hook to roll after attachment and to further improve the clamping action of the hook. Although FIGS. 2A and 2B show a soft, non-rigid gliding lure employing a hook 42 with barb portion 106 passing through body 38 of lure 28 by means of hole 108, the hook can be configured, as shown in FIG. 4E, (which also shows a one-piece design) so that tip 110 of barb portion 112 is embedded into body 114 of lure 116.

Figure 4F:
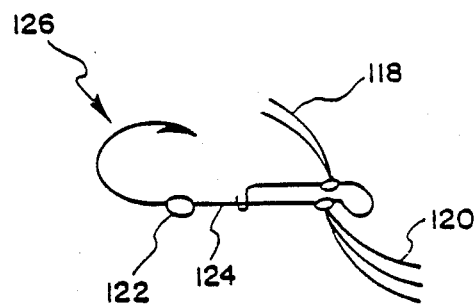

Various features can also be added to the different hook 42 configurations. For example, as shown in FIGS. 4B and 4F, weed guards 118, made of the wire of fibre, or trailers 120 made of hair, living rubber, or other materials can be added to prevent the hook from catching on unwanted objects or to serve as fish attractants. Furthermore, because the hook also acts as the equivalent of a trailing weight, it is desirable that the weight of the hook be adjustable. Therefore, as shown in FIG. 4F, weight 122 can be molded onto shaft 124 of hook 126 to adjust the overall weight of the hook. In some embodiments, for example the spoon configurations described below, weight 122 can function as a leading weight.

Figure 4G:
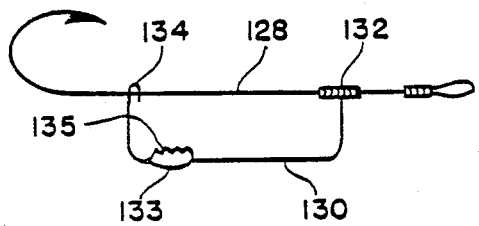

Finally, the hook can be configured as shown in FIG. 4G so that hook body 128 mounts on the upper surface of a lure as shown in FIG. 11B. In FIG. 4G, wire retainer 130 secures hook body 128 by means of wire wrap 132 and catch 134. As with the hooks of FIGS. 4A through 4F, wire retainer 130 passes through holes in the body of a soft, non-rigid gliding lure and firmly clamps the hook to the lure when catch 134 is fastened to hook body 128. As with the hook shown in FIG. 4F, a weight 133 can be added to the hook of FIG. 4G on wire retainer 130 to adjust the overall weight of the hook or to function as a leading weight. Serrations 135 can be added to weight 133 to improve the clamping action of the hook.

As can be seen from the drawings, the invention can be configured in many shapes and can resemble many different organisms. The invention can also contain many different features which produce special gliding or retrieval effects or which tend to attract fish.

Figure 5:
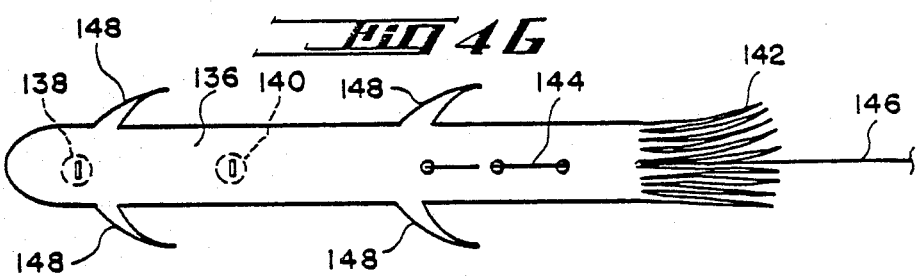
FIG. 5 is a plan view of a fishing lure constructed in accordance with the invention to resemble a lizard.

As disclosed in FIGS. 2A and 2B, the invention can be configured to represent a flat worm of any desired length, with or without tail 34 shown in the figures. FIG. 5, however, shows the flat worm configuration modified to resemble a lizard. Body 136 is generally shaped like the worm configuration of FIGS. 2A and 2B. Leading weight 138 and trailing weight 140 are disposed along a cooperate with body 138 to produce a shallow in-water glide. Tail 142 stabilizes the glide and attracts fish. Tail 142 also creates a drag during retrieval that causes the lure to sharply rise at an angle towards the water surface. Hook 144 connects the lure with fishing line 146 and provides the means for catching fish. Legs 148 laterally extend from body 136 and give the lure the appearance of a lizard.

Figure 6A:
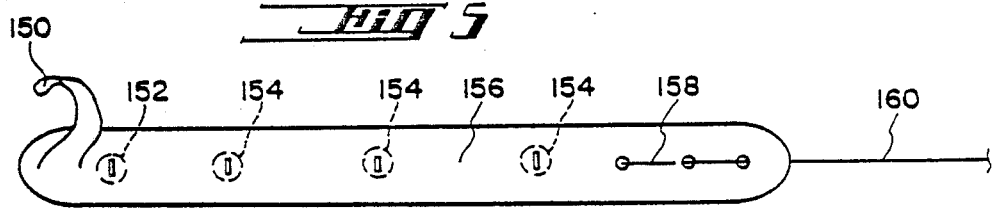
FIG. 6A is a plan view of a fishing lure constructed in accordance with the invention to resemble a flat worm with a curly appendage.
Figure 6B:
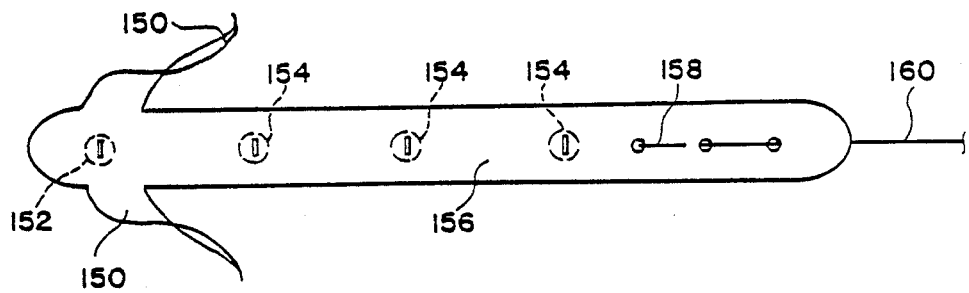
FIG. 6B is a plan view of a fishing lure constructed in accordance with the invention to resemble a flat worm with two curly appendages.

In FIGS. 6A, 6B and 6C, the worm configuration has been modified to include curly appendages 150 which cause disturbances in water which tend to attract fish during glide and retrieval. As in the worm configuration of FIGS. 2A and 2B, leading weight 153 and trailing weights 154 are disposed along and cooperate with body 156 to produce a glide. Hook 158 passes through body 156 and connects the lure to line 160. One or more curly appendages 150, which can be made of the same material as that of body 156, extend from body 156. Curly appendages 150 can extend from any point on body 156 as shown in the figures.

In FIG. 7 the invention is configured to represent a centipede. Body 162 is similar to body 38 of the worm design of FIGS. 2A and 2B and cooperates with leading weight 164 and trailing weights 166 to produce a glide in water. Hook 168 provides the means for catching fish, and tail 170 stabilizes the lure, attracts fish and creates a drag that causes the lure to sharply rise during retrieval. Filaments 172, made of hair, living rubber or the same material as that of body 162, for example, are longitudinally disposed along and laterally extend from body 162 to give the lure the appearance of a centipede.

FIG. 8 shows the worm configuration of FIGS. 2A and 2B modified to include rib simulations. As with the other flat worm configurations, leading weight 174 and trailing weights 176 cooperate with body 178 to produce a glide a water. Hook 180 connects the lure with line 182 and provides the means for catching fish. Rib simulations 184 longitudinally disposed along and laterally extending from body 178 cause disturbances which attract fish. One or more curly appendages 186 can also be disposed on body 178 to further cause disturbances which attract fish.

In FIG. 9 the invention is configured to resemble a curled snake or eel. Body 188 is formed in a U-shape having two trailing body portions 190 and 192. Leading weight 194 is disposed on body 188 at the junction of trailing body portions 190 and 192. Trailing weights 196 are disposed on trailing body portions 190 and 192 and with leading weight 194 cooperation with body 188 to produce a glide in water. Hook 198 is attached to one trailing body portion 192.

The invention can also be configured to generally resemble a spoon lure. In FIGS. 10A and 10B, body 200 is made of a soft, non-rigid material and is convex, or flat on bottom 202 and flat or slightly concave on top 204. Weight 206, which performs the function of a leading weight, is disposed on shaft 208 of hook 210 and cooperates with body 200 and other portions of hook 210 to produce a glide in water. Hook 210, with wire retainer 212, metal bond 214 and catch 216 is secured to body 200 through holes 218. Hook 210 connects the lure to line 200.

FIGS. 11A and 11B show an alternative embodiment of the spoon configuration of the invention. Weight 222, which performs the function of a leading weight, is disposed on wire retainer 224 of hook 226 and cooperates with body 228 and the other parts of hook 226 to produce a glide in water. Hook 226 with wire retainer 224, wire wrap 230 and catch 232 provides the means for catching fish and is secured to body 228 through hook mounting holes 234. Hook 226 also connects the lure at eyelet 233 to line 236 which passes through line hole 237. Hook 226 can also connect the lure to line 236 at bend 235.

FIGS. 12 and 13 also show alternative embodiments of the spoon configuration of the invention. In FIG. 12, weight 238 which performs the function of a leading weight, is molded onto shaft 240 of conventional hook 242 which is embedded in body 244 during fabrication of the lure. Weight 238, hook 242 and body 244 all cooperate to produce a glide in water. In FIG. 13, weight 246, which performs the function of a leading weight, is molded onto wire 248 which is embedded into body 250 during fabrication of the lure. Leading end 252 of wire 248 is formed into an eyelet 254 and attaches to a conventional three-barbed hook 256. Trailing end 258 of wire 248 is also formed into an eyelet 260 and connects the lure to line 262. Weight 246, wire 248 and hook 256 all cooperate with body 250 to produce a glide in water.

Like the worm configuration, the spoon configuration can include various features and can represent various organisms. In FIG. 14 a spoon configuration similar to the configuration of FIGS. 10A and 10B is shown. Tail 264 is attached to body 266 at trailing edge 268 and stabilizes the lure during a glide. Tail 264 also attracts fish and creates a drag during retrieval that causes the lure to more sharply rise at an angle towards the water surface.

In FIG. 15, another spoon configuration similar to the configuration of FIGS. 10A and 10B is shown. Curly appendage 270 is attached to body 272 at trailing edge 274 and causes disturbances in water during glide and retrieval which tend to attract fish. The curly appendage, alternatively shown as 270' can also attached to body 272 at leading edge 275. When curly appendage 270 is attached at trailing edge 274, it also serves the function of a tail by stabilizing the lure during a glide and by creating a drag during retrieval that causes the lure to sharply rise.

In FIG. 16 the invention is shown in a spoon configuration which resembles a frog. Soft, non-rigid body 276 is of a spoon-shape similar to the shape of the lures shown in FIGS. 10A through 13. Hook 278 is similar to the hook of FIGS. 10A and 10B and contains weight 280 which functions as a leading weight. Hook 278 with weight 280 cooperates with body 276 to produce a glide in water. Hook 278 also provides the means for catching fish and connects the lure to line 282. Legs 284, which can be made of the same material as body 276, laterally extend from body 154 and give the lure the appearance of a frog.

In FIGS. 17A, 17B and 17C the invention is shown in spoon configurations resembling crayfish. In each figure, weight 286, which functions as a leading weight, is disposed on a hook 288 similar to the hook of FIGS. 10A and 10B. Weight 286 and hook 288 cooperate with body 290 to produce a glide in water. Arms 292, resembling the pinchers of a crayfish and which can be made of the same material as body 290, laterally extend from body 290 near leading edge 294 of the lure. Fan tail 296 of FIG. 17C or streamer tail 298 of FIG. 17B can extend from body 290 at trailing edge 300 to further give the lure the appearance of a stylized crayfish, to stabilize the lure during a glide and to cause the lure to rise more sharply to the water surface during retrieval.

The invention can also be configured in a tubular shape. In FIGS. 18A and 18B soft, non-rigid body 302 is configured in a tubular shape. Leading edge 303 can either be open as shown or closed. Leading weight 304 and trailing weight 306 are disposed along bottom 308 of body 302 and cooperate with body 302 to produce a glide in water. Hook 310 similar to the hook of FIG. 14C is disposed in bottom 308 of body 302 near trailing edge 312 and connects the lure to line 314. Hook 310 can alternatively be disposed in top 316 of body 302. Tail 318 is attached to body 302 near hook 310.

The invention can be configured to represent a minnow or other fish. In FIGS. 19A, 19B and 19D body 320 is configured on top 322 to represent a fish. Bottom 324 is substantially flat. Leading weight 326 is disposed on bottom 324 and cooperates with body 320 to produce a glide in water. Hook 328 which provides the means for catching fish, passes through body 320 and connects with line 330. The lure can be configured to glide tail first as shown in FIGS. 19A and 19B, or head first as shown in FIG. 19C. A curly appendage 332, shown in FIG. 19A, or any other disturbance causing feature such as bulbous portion 334, shown in FIGS. 19B and 19C can be added.

The invention can also be configured to resemble conventional crankbait or plug lures. In FIGS. 20A through 22 the invention is configured to represent conventional crankbait or plug lures employing multiple three-barbed hooks and flat lips or surfaces which cause the lures to dart and wobble during retrieval. As best can be seen in FIGS. 20A, 21 and 22, wire 336 upon which leading weight 338 is molded is embedded in body 340 during manufacture of the lures. Wire 336 extends the length of the lures and contains eyelet 342 at leading edge 344 and bend 346 at an intermediate position to which conventional three-barbed hooks 348 are attached. In FIG. 20A, trailing end 350 of wire 336 is formed into an eyelet 365 and attaches to upper end 354 of lip 356 partially embedded in trailing portion 358 of body 340. Lip 356 downwardly extends from body 340 and is connected to line 360 by means of eyelet 362. Lip 356 causes the lure of FIG. 20A to dart and wobble during retrieval.

In FIG. 21 flat surface 364 of body 340 performs substantially the same function as lip 356 of FIG. 20A. In FIG. 21, however, trailing end 350 of wire 336 is directly connected to line 360 by means of eyelet 352. In FIG. 22 lip 366 is integrally formed with body 340 from the same material as body 340 into a streamlined position beneficial during a glide. During retrieval water pressure acting against flat surface 368 of lip 366 causes lip 366 to deflect downward to produce the desired wobble and darting actions during retrieval.

The invention can also be configured to represent conventional subsurface fly lures. Because subsurface fly lures are very light, they can be made to glide with a very small weights. Furthermore, in addition to lightweight soft plastic, the bodies of subsurface fly lures fabricated in accordance with the invention can be made of natural or synthetic hair, feathers or thin strips of leather. In FIG. 23 leading weight 370 is molded on mono-filament 372 and both are embedded in body 374. Hook 376 is attached to bottom 378 of body 374 at trailing end 380 by means of windings 382 employed for conventional subsurface fly lures. As can be seen in FIG. 24, one or more trailing weights 384 can be employed where the body 386 (in this case a thin strip of leather with hair) is long and requires additional weights for stabilization. The leading weight 388 and trailing weight 384 used in the configuration of FIG. 24 can be similar to the weight shown in FIGS. 3C and 3D.

FIG. 25 shows the invention configured to represent a popper subsurface fly lure. Hook 390 is embedded in soft gliding body 392 during fabrication of the lure. A weight, which can function as the leading weight, can be molded onto the shaft of hook 390 and embedded with hook 390 into the soft plastic gliding body 392. Hackle 394, made of natural or synthetic hair can be added to attract fish.

FIG. 26 shows a further embodiment of the invention configured to represent a subsurface fly lure. Hook 396 with leading weight 398 is embedded in body 400 made of soft, non-rigid plastic shaped to resemble thin wings. Hook 396, leading weight 398 and body 400 all cooperate to produce a glide in water. Feathers 402 can be added to body 400 to further attract fish.

Figure 29A:
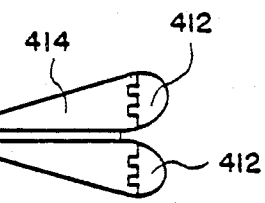
FIG. 29A is a plan view of the rotating portion of a buzzer having hinged blades.
Figure 29B:
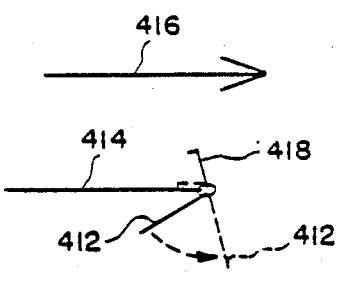
FIG. 29B is a diagram of the action of the buzzer blades shown in FIG. 29A.
Figure 30A:
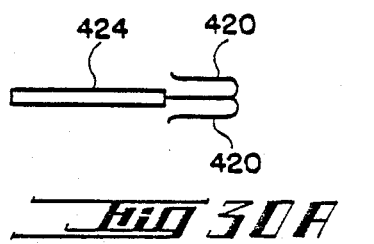
FIG. 30A is a side plan view of a buzzer having blades of soft flexible plastic molded in a closed position.
Figure 30B:
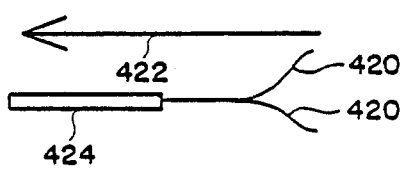
FIG. 30B is a diagram of the opening action of the blades of the buzzer of FIG. 30A.

Various other features which have fish attracting properties can be used with the invention without destroying the gliding ability of the invention. For example, a buzzer 404 which quickly spins causing a buzzing sound during retrieval can be used in-line with a soft, non-rigid gliding lure 406 as depicted in FIG. 27 or as a buzzbait as depicted in FIG. 28. Arm 408 of FIG. 28 is metal bonded to hook 410 at the eyelet where a line otherwise attaches. To reduce drag during a glide, the offset blades 412 of buzzer 414 can be hinged as shown in FIGS. 29A and 29B. As shown in FIG. 29B, during a glide in the direction of arrow 416, water pressure from the glide forces offset blade 412 to close. Offset blade 412 therefore causes little drag during the glide. During retrieval, however, water pressure in the opposite direction forces offset blade 412 to open to an angle limited by stop 418 and spin buzzer 414. The same result can be produced through use of soft plastic buzzer 428 blades stress molded in a closed position as shown in FIG. 30A. During retrieval in the direction of arrow 422 water pressure causes the blades 420 to open and spin buzzer 424.

Figure 31:
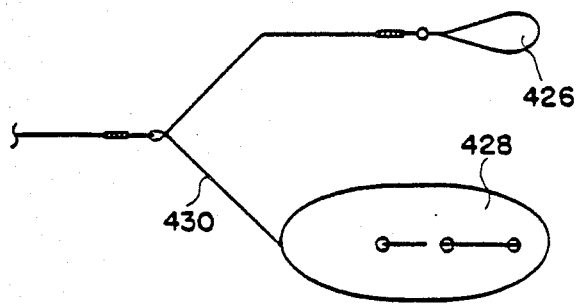
FIG. 31 is a top plan view of one embodiment of the invention constructed as a spinnerbait.
Figure 32:
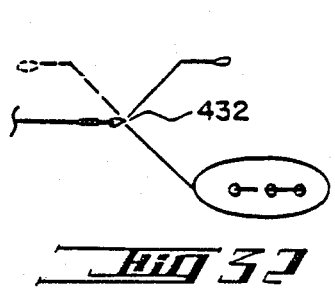
FIG. 32 is a diagram of one embodiment of the invention used as a spinnerbait and having a hinged joint in the arm from which a spinner is suspended.
Figure 33:
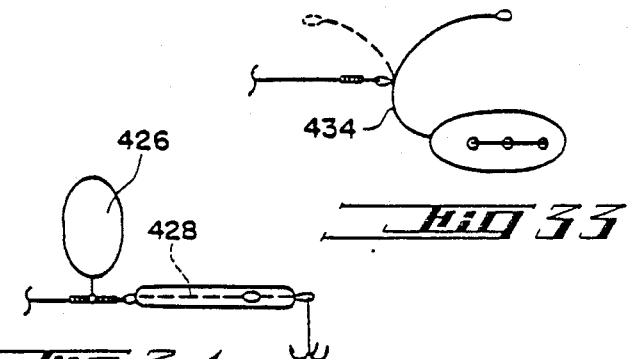
FIG. 33 is a diagram of a spinner jig used in conjunction with the invention and comprised of a flexible wire.
Figure 34:
FIG. 34 is a side plan view of a spinner blade used in-line in conjunction with one embodiment of the invention.
Figure 35:
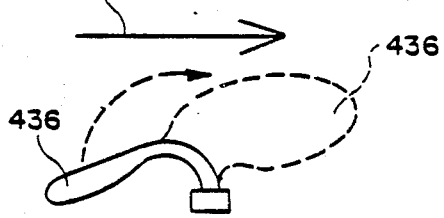
FIG. 35 is a diagram of the opening action of a soft flexible spinner blade molded in a closed position and used in conjunction with the invention.
Figure 36:
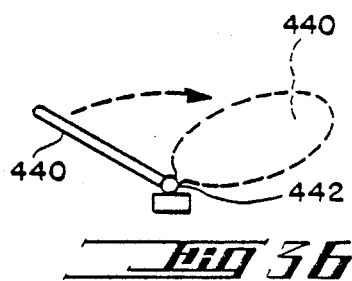
FIG. 36 is a diagram of the opening action of a hinged spinner blade used in conjunction with the invention.

Spinner blades made of metal, soft plastic or other materials can also be used in conjunction with the invention as shown in FIGS. 31 through 34. As with the buzzers discussed above, spinner blade 426 can be used in-line with soft, non-rigid gliding lure 428 as shown in FIG. 34 or as a spinnerbait as shown in FIG. 31. Attachment of arm 430 is similar to the attachment of arm 408 of FIG. 28 discussed above. To reduce spin of the non-rigid gliding lure during a glide, arm 430 of FIG. 31 can be jointed as shown in FIG. 32 at line attachment point 432 or can be a jig arm 434 made of a flexible wire as shown in FIG. 33. As can be seen in FIG. 35, to reduce the drag of a spinner blade used with the invention, spinner blade 436 can be made of a soft flexible plastic stress molded in a folded-back position for a glide in the direction of arrow 438. During retrieval in the direction opposite to arrow water pressure opens soft plastic spinner blade into spinning position. The same reduction in drag can be produced with a hard spinner blade 440 mounted on hinge 442 as shown in FIG. 36.

Figure 38:
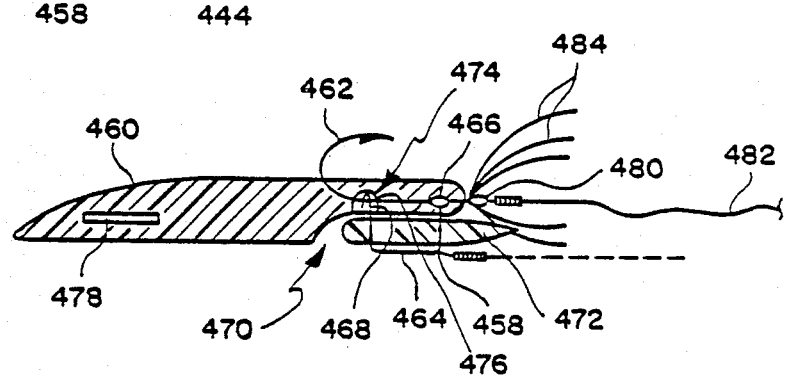
FIG. 38 is a side plan view of an embodiment of the invention configured to carry non-gliding material.
Figure 39:
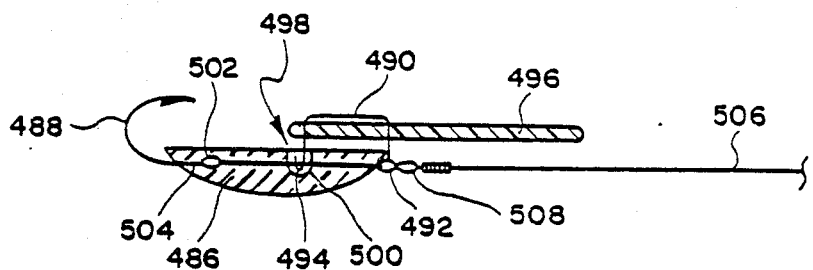
FIG. 39 is a side plan view of an embodiment of the invention configured to carry a non-gliding lure.

Finally, as shown in FIGS. 38 and 39, the invention can be configured to carry a non-gliding lure or other non-gliding materials which are attractive to fish. In FIG. 38, body 460 is approximately of a flat worm shape and is made of a soft, non-rigid material. Hook 462 is a conventional hook which is embedded into body 460 during fabrication of the lure and provides the structure to which retainer 464, made of wire, is attached. Retainer 464 is similar to the wire retainer of the hook of FIG. 4A because prior to placement of hook 462 into body 460 retainer 464 is connected to hook 462 by means of metal bond 466 and releasable catch 468. Retainer 464, however, downwardly extends out of body 460 into cutaway 470 of body 460 to provide the means for retaining non-gliding material 472, for example a strip of pork rind, in cutaway 470. Well 474 removed from body 460 provides catch 468 access to the portion 476 of hook 462 to which catch 468 attaches. Leading weight 478 is also embedded in body 460 during fabrication of the lure. Leading weight 460, hook 462, retainer 464 and non-gliding material 472 all cooperate with body 460 to produce a glide in water. Eyelet 480 of hook 462 connects the lure line 482 and trailers 484, made of natural or artificial hair or living rubber for example, can be added at eyelet 480 to increase the attractiveness of the lure to fish. Line 482 can also attach at bend 485 of retainer 464 to provide the lure with the sharp rising action during retrieval discussed above.

In FIG. 39, body 486 is of a spoon shape and made of a soft, non-rigid material. Like the lure of FIG. 38, hook 488 is a conventional hook which is embedded in body 486 during fabrication of the lure and provides the structure to which retainer 490, also made of wire, is attached. Retainer 490 is connected to hook 488 by means of metal bond 492 and releasable catch 494. Retainer 490 upwardly extends from hook 488 and provides the means for retaining non-gliding lure 496, for example a conventional plastic worm. Well 498 removed from body 486 provides catch 494 access to the portion 500 of hook 488 to which catch 494 attaches. Leading weight 502 is molded onto shaft 504 of hook 488 prior to placement of hook 488 into body 486. Leading weight 502, hook 488, retainer 490 and non-gliding lure 496 all cooperate with body 486 to provide a glide in water. Line 506 connects to the lure at eyelet 508 of hook 488.

Figure 37:
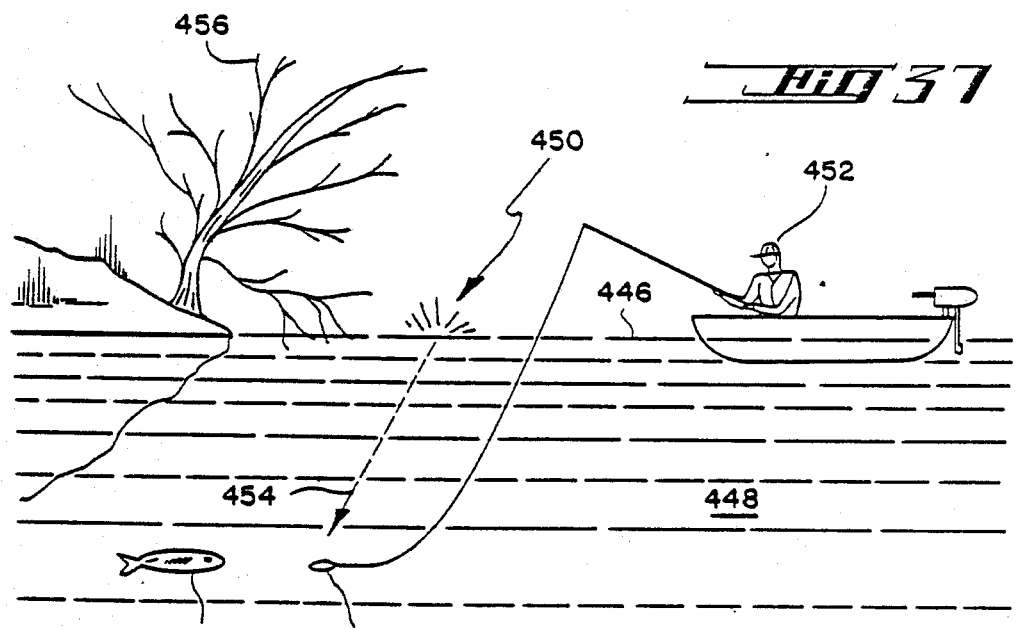
FIG. 37 is diagrammatic representation of the gliding action of a lure constructed in accordance with the invention.

Referring now to FIG. 37, there is shown the gliding action of a lure constructed in accordance with the invention. Upon a cast, lure 444 strikes the surface 446 of water 448 at impact point 450. Upon impact, lure 444 immediately assumes a gliding position and begins gliding away from fisherman 452 in a downward path indicated by arrow 454. The downward gliding path indicated by arrow 454 enables fisherman 452 to position lure 444 under obstruction 446 and closer to fish 458. The gliding path indicated by arrow 454 can vary slightly depending upon the exact configuration of non-rigid gliding lure 444. A sample of some of the above-discussed configurations and their glide profiles is presented in the following table:

EXAMPLES OF GLIDE PROFILES OF SOFT GLIDING LURES

| LURE TYPE | LENGTH (in.) | DEFLECTION[1] | TAIL LENGTH (in.) | # WGT[2] | LIFT SURFACE (sq. in.) | DISTANCE BETWEEN TRAILING WGT (in.) | HORIZ. GLIDE DIST. PER IN. OF VERT FALL (in.) |
|---|---|---|---|---|---|---|---|
| Soft Spoon | 1.8 | Ex. Soft (1) | 0.0 | 3 | 1.84 | 1 | 1.1 |
| Flat Worm | 3.75 | Ex. Soft (1) | 2.75 | 2 | 2.88 | 1.75 | 1.025 |
| Flat Worm long tail | 3.75 | Ex. Soft (1) | 3.33 | 1 | 2.88 | 2.5 | 0.85 |
| Flat Worm | 4.5 | Soft (2) | 1.5 | 2 | 3.05 | 1.87 | |
| Flat Worm | 7.25 | Soft (2) | 0.0 | 4 | 4.7 | 2 to 3 | 1.25 |
| Flat Worm | 7.50 | Sup. Soft | 0.0 | 6 | 6.0 | 1.1 | 1.1 |

-continued

EXAMPLES OF GLIDE PROFILES OF SOFT GLIDING LURES

| LURE TYPE | LENGTH (in.) | DEFLECTION[1] | TAIL LENGTH (in.) | # WGT[2] | LIFT SURFACE (sq. in.) | DISTANCE BETWEEN TRAILING WGT (in.) | HORIZ. GLIDE DIST. PER IN. OF VERT FALL (in.) |
|---|---|---|---|---|---|---|---|
| (0) | | | | | | | |

Notes:
[1]Deflection Properties.
0 = Pure Vinyl Plastisol, deflects 1.6 in./2 in. of material
1 = Plastisol + 10% thickener, deflects 1.4 in./2 in. of material
2 = Plastisol + 20% thickener, deflects 1.2 in./2 in. of material
[2]Number of weights. Test weights were adapted Water Gremlin Split Shot Weights. For example,
1 = split shot, weight 1/64 oz. each
2 = 2 split shots, weight 1/64 oz. each, or equivalent thereof
n = n split shots, weight 1/64 oz. each, or equivalent thereof Having indicated a preferred and many alternative embodiments of the present invention, it will occur to one skilled in the art that other modifications and alternatives can be practiced in the spirit of the invention. It is therefore intended that the scope of the invention be defined only by the following claims.

What is claimed is:

1. An operator controllable fishing lure which glidingly descends in water, comprising:
   a pliant body shaped for lift while gliding in water;
   a hook associated with said pliant body for catching fish;
   means for providing operator control of said lure; and
   weighting means associated with said pliant body for controlling deflection of said pliant body and for orienting said pliant body into a gliding position in water whereby said pliant body is cause to glidingly descend in a forward manner when released from operator control.

2. The lure of claim 1, wherein said pliant body has a flat, elongated oval shape in the plane of glide.

3. The lure of claim 2, wherein said weighting means further includes at least one discrete weight.

4. The lure of claim 3, wherein said pliant body has a leading edge and said weight includes a leading weight spaced back from said leading edge a distance related to a flexibility characteristic of said pliant body to produce a non-stalling glide characteristic in said lure.

5. The lure of claim 1, wherein said pliant body has a flat, worm-like shape in the plane of glide.

6. The lure of claim 5, wherein said pliant body further includes at least one flexible tail attached to said pliant body and providing glide stabilization without lift.

7. The lure of claim 5, wherein said pliant body further includes a plurality of appendages resembling legs of an amphibious creature extending laterally from said pliant body.

8. The lure of claim 5, wherein said pliant body further includes at least one curly appendage extending from said pliant body.

9. The lure of claim 5, wherein said pliant body further includes a plurality of rib simulations laterally extending and longitudinally disposed on said pliant body.

10. The lure of claim 5, wherein said weighting means further includes at least one discrete weight.

11. The lure of claim 10, wherein said pliant body has a leading edge and said weight includes a leading weight spaced back from said leading edge a distance related to a flexibility characteristic of said pliant body to produce a non-stalling glide characteristic in said lure.

12. The lure of claim 5, wherein said weighting means further includes a plurality of weights longitudinally spaced along said pliant body.

13. The lure of claim 12, wherein said pliant body has a leading edge and said plurality of weights includes a leading weight spaced back from said leading edge a distance related to a flexibility characteristic of said pliant body to produce a non-stalling glide characteristic in said lure.

14. The lure of claim 1, wherein said pliant body has a tubular shape.

15. The lure of claim 14, wherein said pliant body further includes at least one non-lifting flexible tail attached to said pliant body to provide glide stabilization.

16. The lure of claim 14, wherein said weighting means further includes a plurality of weights longitudinally spaced along said pliant body.

17. The lure of claim 16, wherein said pliant body has a leading edge and said plurality of weights includes a leading weight spaced back from said leading edge a distance related to a flexibility characteristic of said pliant body to produce a non-stalling guide characteristic in said lure.

18. The lure of claim 1, wherein said pliant body has two flat arms in a U-shape and said hook is integrated with one arm of said U-shaped pliant body.

19. The lure of claim 18, wherein said weighting means further includes a plurality of weights spaced along said U-shaped pliant body.

20. The lure of claim 19, wherein said pliant body has a leading edge and said plurality of weights includes a leading weight spaced back from said leading edge a distance related to a flexibility characteristic of said pliant body to produce a non-stalling glide characteristic in said lure.

21. A soft gliding lure comprising:
    a lure body formed of a flexible material and having a shape which provides lift to said body as it glides through water;
    said body having a predetermined weight distribution, whereby the weight distribution controls the deflection of said body during gliding;
    said body adapted to assume a downwardly angled glide path in water when unrestrained, wherein said body is stabilized on said glide path by a combination of body lift and weight distribution; and
    a fish hook associated with said body for catching fish.

* * * * *